(12) United States Patent
Fay et al.

(10) Patent No.: US 7,062,480 B2
(45) Date of Patent: Jun. 13, 2006

(54) SYSTEM AND METHOD FOR CACHING AND UTILIZING FLIGHT AVAILABILITY DATA

(75) Inventors: Diane Fay, Atlanta, GA (US); Lori Senn, Atlanta, GA (US)

(73) Assignee: Worldspan, LP, Atlanta, GA (US)

( * ) Notice: Subject to any disclaimer, the term of this patent is extended or adjusted under 35 U.S.C. 154(b) by 0 days.

(21) Appl. No.: 10/114,748

(22) Filed: Apr. 1, 2002

(65) Prior Publication Data

US 2003/0187851 A1  Oct. 2, 2003

(51) Int. Cl.
*G06F 17/30* (2006.01)

(52) U.S. Cl. ............... 707/2; 707/3; 707/9; 707/10; 707/102; 705/6; 703/26

(58) Field of Classification Search ............... 705/6; 707/3, 4, 5, 6, 9, 10, 102; 703/26
See application file for complete search history.

(56) References Cited

U.S. PATENT DOCUMENTS

| | | | | |
|---|---|---|---|---|
| 5,832,451 A * | 11/1998 | Flake et al. | .................... | 705/5 |
| 6,134,534 A * | 10/2000 | Walker et al. | ................. | 705/26 |
| 6,161,097 A * | 12/2000 | Glass et al. | ..................... | 705/6 |
| 6,219,680 B1 | 4/2001 | Bernardo et al. | | |
| 6,263,315 B1 * | 7/2001 | Talluri | .......................... | 705/8 |
| 6,269,365 B1 * | 7/2001 | Kiyoki et al. | .................. | 707/6 |
| 6,275,808 B1 | 8/2001 | DeMarcken | | |
| 6,289,358 B1 | 9/2001 | Mattis et al. | | |
| 6,295,521 B1 | 9/2001 | DeMarcken et al. | | |
| 6,307,572 B1 | 10/2001 | DeMarcken et al. | | |
| 6,418,413 B1 * | 7/2002 | DeMarcken et al. | ........... | 705/5 |
| 6,430,561 B1 * | 8/2002 | Austel et al. | .................. | 707/9 |
| 6,493,810 B1 * | 12/2002 | Pang et al. | ................. | 711/170 |
| 6,625,603 B1 * | 9/2003 | Garg et al. | .................... | 707/9 |

FOREIGN PATENT DOCUMENTS

WO    WO 01/33472 A2 *   5/2001

* cited by examiner

*Primary Examiner*—Tim Vo
*Assistant Examiner*—Hung Pham
(74) *Attorney, Agent, or Firm*—Womble Carlyla Sandridge and Rice, PLLC

(57) ABSTRACT

A system (10) operable to cache and retrieve flight availability data comprises a cache database (50) for storing flight availability data, an airline cache control (60) for configuring the cache database (50) for a plurality of airlines, a subscriber cache control (70) for configuring the cache database (50) for a plurality of subscribers (20), a cache query utility (80) for interacting with the cache database (50). The system (10) further comprises a data display utility (90) for displaying flight availability data stored in the cache database (50), a success rate utility (100) for tracking statistics associated with use of the cache database (50), and a dual mode processing utility (110) that allows a technician to access flight availability data from either the cache database (50) or a real-time response. The system (10) is preferably used as an intermediary between the subscribers (20) and a plurality of airline servers (25).

21 Claims, 3 Drawing Sheets

SYSTEM AND METHOD FOR CACHING AND UTILIZING FLIGHT AVAILABILITY DATA

BACKGROUND OF THE INVENTION

1. Field of the Invention

The present invention relates to airline flight availability data. More particularly, the present invention relates to an efficient system and method of caching and utilizing airline flight availability data for specific subscribers.

2. Description of Prior Art

Booking an airline flight requires access to flight availability data, such as flight schedules and availability of seats. This information is updated and controlled by airlines and available from their airline servers.

In the past, only travel agents and airline personnel had access to airline servers and flight availability data. Computer systems allowed travel agents to be networked to airline servers through proprietary networks not available to individual clients. The proprietary networks were typically operated by travel information providers who provided electronic distribution of travel information to subscribing travel agencies. This limited access to airline servers and burdens placed on them.

With the ever increasing use of the Internet, many Internet web sites have been developed that also subscribe to services provided by travel information providers and allow individual clients to request flight availability data. When travel information providers receive flight availability data requests from their subscribers, they typically access airline servers in order to fulfill those requests. Therefore, each flight availability data request places burdens on both travel information providers and airline servers.

Many travel information providers rely on real-time requests to airline servers for flight availability data. Real-time requests may be either direct access requests or seamless availability requests. Since direct access requests and seamless availability requests are real-time requests, they reflect current flight availability data. Direct access requests provide information based on the identity of an individual subscriber and include all classes of service available to that subscriber. However, direct access requests are specific to each airline and subscribers must generate a unique direct access request for each airline from which they would like flight availability data. Furthermore, direct access cannot be used when airline servers are unavailable.

Seamless availability requests allow subscribers to access flight availability data from multiple airlines simultaneously. Seamless availability requests provide information based on the identity of an individual subscriber and include all classes of service available to that subscriber. However, seamless availability requests cannot be used when airline servers are unavailable.

Allowing individual clients to request flight availability data through real-time requests has dramatically increased burdens placed on travel information providers and airline servers. Specifically, as people increasingly use these web sites to check flight availability data, network traffic through travel information providers to airline servers increases.

Additionally, many travel agencies now use advanced search tools that also dramatically increase burdens placed on travel information providers and airline servers. These advanced search tools may generate several real-time requests for one trip, in an effort to find a low cost alternative or an alternate route.

Use of these web sites and advanced search tools leads to system overload conditions, such as network congestion, inadequate processing capacity, and inadequate infrastructure. System overload conditions can make airline servers unavailable. These issues lead to lost sales, denied sales, and other related problems. Therefore, many airlines and travel information providers have expressed a need to reduce these burdens.

A current method of obtaining flight availability data when airline servers are unavailable relies on availability status messages (AVS) received from airline servers and stored in a third party database. This AVS system is generic and cannot provide information based on the identity of a subscriber. Therefore, the AVS system may not include all classes of service available to any one subscriber. Additionally, the AVS system stores flight availability data based on each individual flight and not based on a trip's actual origin and destination. Therefore, the AVS system may not reflect complete flight availability data. Furthermore, the AVS system relies on the airline servers to keep it updated and, for that reason, may not reflect the most current flight availability data. Finally, in deciding whether or not to sell each trip, airlines consider many factors, such as the identity of the subscriber and the actual origin and destination. For these reasons, airlines often deny sales when the AVS system shows that there are seats available.

The AVS system can be useful for quick checks of flight availability data. However, subscribers must use a real-time request for accurate checks of updated flight availability data.

Accordingly, there is a need for an improved system and method of caching and utilizing airline flight availability data for specific subscribers that overcomes the limitations of the prior art.

SUMMARY OF THE INVENTION

The present invention overcomes the above-identified problems and provides a distinct advance in the art. More particularly, the present invention provides a system and method of efficiently caching and utilizing airline flight availability data for specific subscribers.

The system is preferably used by a plurality of subscribers as a bridge to a plurality of airline servers and is capable of responding to an availability request with an availability response containing flight availability data. The system receives the availability request and, if necessary, may send a real-time request to the airline servers. When the system receives a real-time response from the airline servers, flight availability data from the real-time response is used to send the availability response to the requesting subscriber.

The system broadly comprises a cache database for temporarily storing or caching flight availability data received from the airline servers, an airline cache control for configuring the cache database specifically for each of a plurality of airlines, a subscriber cache control for configuring the cache database specifically for each of the subscribers, and a cache query utility for interacting with the cache database. The system further comprises a data display utility for displaying flight availability data stored in the cache database, a success rate utility for tracking statistics associated with use of the cache database, and a dual mode processing utility that allows a technician to access flight availability data from either the cache database or the real-time responses.

Flight availability data from the real-time response may be stored in the cache database and used to fulfill subsequent availability requests from the same subscriber. The stored flight availability data may be used instead of sending another real-time request to the airline servers, thereby reducing a total number of real-time requests and real-time responses the system and the airline servers must handle. Additionally, the stored flight availability data may be utilized when either the real-time request or the real-time response fails.

The cache database is preferably configured to only store flight availability data for subscribers identified by a subscriber identification (SID) and airlines identified by an airline carrier code (CC) that have been configured to use the cache database. This enables fast access to the flight availability data for those SIDs and CCs.

The airline cache control is used to configure a day range, a shelf-life, and a minimum seat count for flight availability data stored in the cache database for each airline. The day range specifies for how many days in the future flight availability data should be cached. The shelf-life is preferably no greater than 30 minutes in order to prevent flight availability data from becoming stale. The seat count may be used to specify a minimum number of available seats in order to use flight availability data stored in the cache database.

The airline control also allows each airline to identify specific SIDs that may use flight availability data stored in the cache database for that airline. Alternatively, each airline may allow any SID to use flight availability data stored in the cache database for that airline.

The subscriber control is used to configure each SID to use or not use flight availability data stored in the cache database. Additionally, the subscriber control allows SIDs to be grouped into SID families and each SID family to be configured as either access-type or update-type. Access-type allows each SID in an access-type SID family to access the flight availability data stored in the cache database for that SID family. However, a child SID in the access-type SID family may not update the cache database. Only a parent SID of the access-type SID family may update the cache database. Update-type allows each SID in an update-type SID family to both access and update the flight availability data stored in the cache database for that SID family. Flight availability data is stored in the cache database specifically for each SID or SID family and is only available to that SID or SID family.

The cache query utility interfaces with the cache database on behalf of the subscribers and deletes trips from the cache database after their shelf-life has expired, as configured in the airline cache control. When flight availability data is received from one of the airline servers in the form of the real-time response, the cache query utility adds the flight availability data to the cache database for use by the subscriber that generated the availability request. When each availability request is received, the cache query utility queries the cache database for a matching trip and forwards any appropriate flight availability data to the requesting subscriber.

The success rate utility tracks statistics associated with use of flight availability data stored in the cache database and includes a sell failure rate, a total attempts number, and a total use number. The sell failure rate indicates the percentage rate of sell failures resulting from attempts to sell a trip based upon flight availability data stored in the cache database and can be compared to sell failure rates from the real-time request and sell failure rates from the third party database. The total attempts number indicates how many times flight availability data is queried from the cache database. The total use number indicates how many times flight availability data is returned as a result of querying the cache database. These statistics can be viewed in total, by specific airline, by specific SID, or by specific SID family.

The dual mode processing utility is designed for testing and trouble shooting the system, requesting servers, airline servers, and network connectivity. The dual mode processing utility allows a technician to access flight availability data from either the cache database or the real-time responses. This allows comparisons to determine accuracy of the cache database.

The cache database may be used to back-up an airline server that is experiencing network congestion or outages. If the system sends the real-time request to the airline server but the real-time response is not received, the system may use flight availability data stored in the cache database. If the matching trip does not exist in the cache database, the third party database may be used to populate the availability response Additionally, the cache database may be used as a primary source of flight availability data. In this case, when the availability request is received, the system verifies that the SID is configured to utilize the cache database. The system also verifies that the CC is configured to utilize the cache database. The system then queries the cache database for the matching trip as specified in the availability request. If the cache database contains the matching trip and the matching trip was stored for use by the subscriber, then flight availability data for the matching trip is returned to the subscriber in the form of the availability response. If no matching trip is found, then the system sends the real-time request to the airline servers. Flight availability data returned in the real-time response is used to populate the availability response and the cache database for future use by the subscriber.

If any step fails, a third party database may be used to fulfill the availability request. For example, when no matching trip exists in the cache database, the real-time request is sent to the airline servers. If the real-time response is not received, then flight availability data from the third party database is used to populate the availability response.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
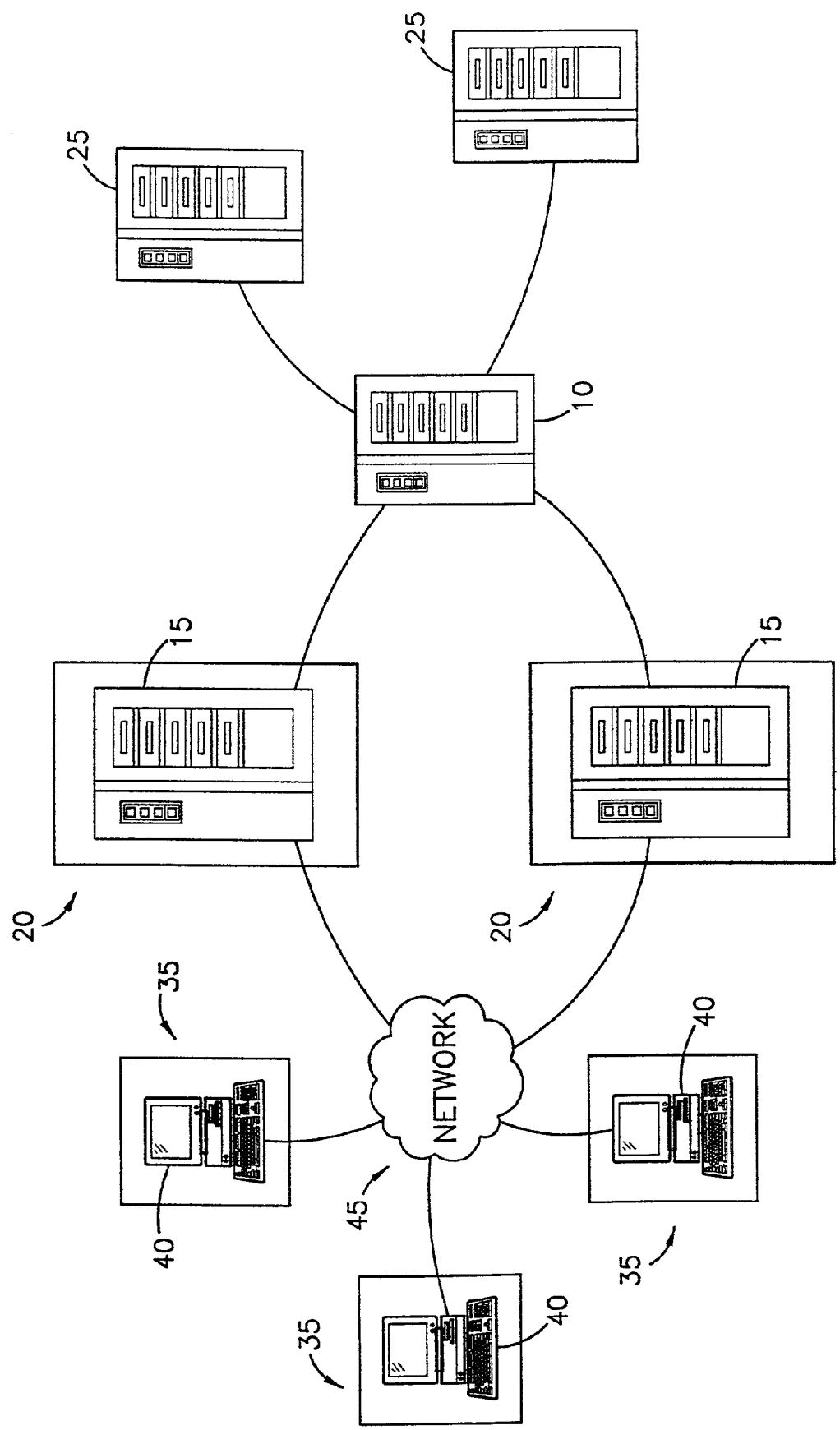
FIG. 1 is a block diagram of a system operable to cache and utilize airline flight availability data according to the present invention shown in a preferred environment wherein the system is connected to a plurality of subscribers and a plurality of airline servers.

Referring to FIG. 1, the preferred system 10 is capable of caching and utilizing airline flight availability data and is preferably used as a bridge between a plurality of requesting servers 15 operated by a plurality of subscribers 20 and a plurality of airline servers 25. The system 10 is capable of responding to an availability request with an availability response containing flight availability data obtained by sending a real-time request to the airline servers 25 and receiving a real-time response from the airline servers 25. The system 10 is preferably operated by a company that provides electronic distribution of travel information to travel agencies, travel providers, and other corporations.

The subscribers 20 may be Internet web sites that provide flight availability data to a plurality of clients 35. Each subscriber 20 may operate one or more requesting server 15 and each requesting server 15 may be customized for each subscriber 20. Each client 35 preferably operates one of a plurality of personal computers 40 and communicates with one of the requesting servers 15 through a network 45, such as, the Internet. The network 45 may be operated by the subscribers 20 or a third party network connectivity supplier.

For example, one of the clients 35 may use his or her personal computer 40 to access one of the requesting servers 15 operated by one of the subscribers 20 through the network 45. The client 35 may use the requesting server 15 to plan a trip and access flight availability data supplied by one or more of the airline servers 25 through the system 10.

Alternatively, the subscribers 20 may be individual travel agents or travel agencies. Additionally, the requesting servers 15 may be simple dumb terminals connected directly to the system 10. Furthermore, the subscribers 20 may connect to the system 10 using on-demand connections, such as, a dial-up connection.

The requesting servers 15 send the availability request to the system 10. The availability request typically includes a subscriber identification (SID) identifying the subscriber 20 originating the availability request, an origin, and a destination. Additionally, the availability request may include a return trip which would start at the destination and finish at the origin. Furthermore, the availability request may specifically involve stops at locations other than the origin and the destination, include an airline carrier code (CC) identifying a specific airline, and/or specify certain dates and times for which to search.

The system 10 receives the availability request and, if necessary, may send the real-time request to the airline servers 25. The real-time request sent from the system 10 may account for factors, such as, minimum connection times between flights, regulatory display parameters, and other criteria.

Other applications, such as, advanced search tools, may also request flight availability data. Advanced search tools are typically used to find a lower fare and/or alternatives to a requested trip. Advanced search tools gather information, such as, departure times and customer preferences for each trip. This information is used to construct alternate itineraries. For example, if a trip starts in Los Angeles and finishes in New York, alternate itineraries might include stops in Denver, Kansas City, and/or Chicago.

These applications may be operated by either the company or the subscribers 20. However, since these applications generate availability requests on behalf of a specific subscriber 20, it will be understood that the term subscriber 20 used throughout this document includes these applications.

Figure 2:
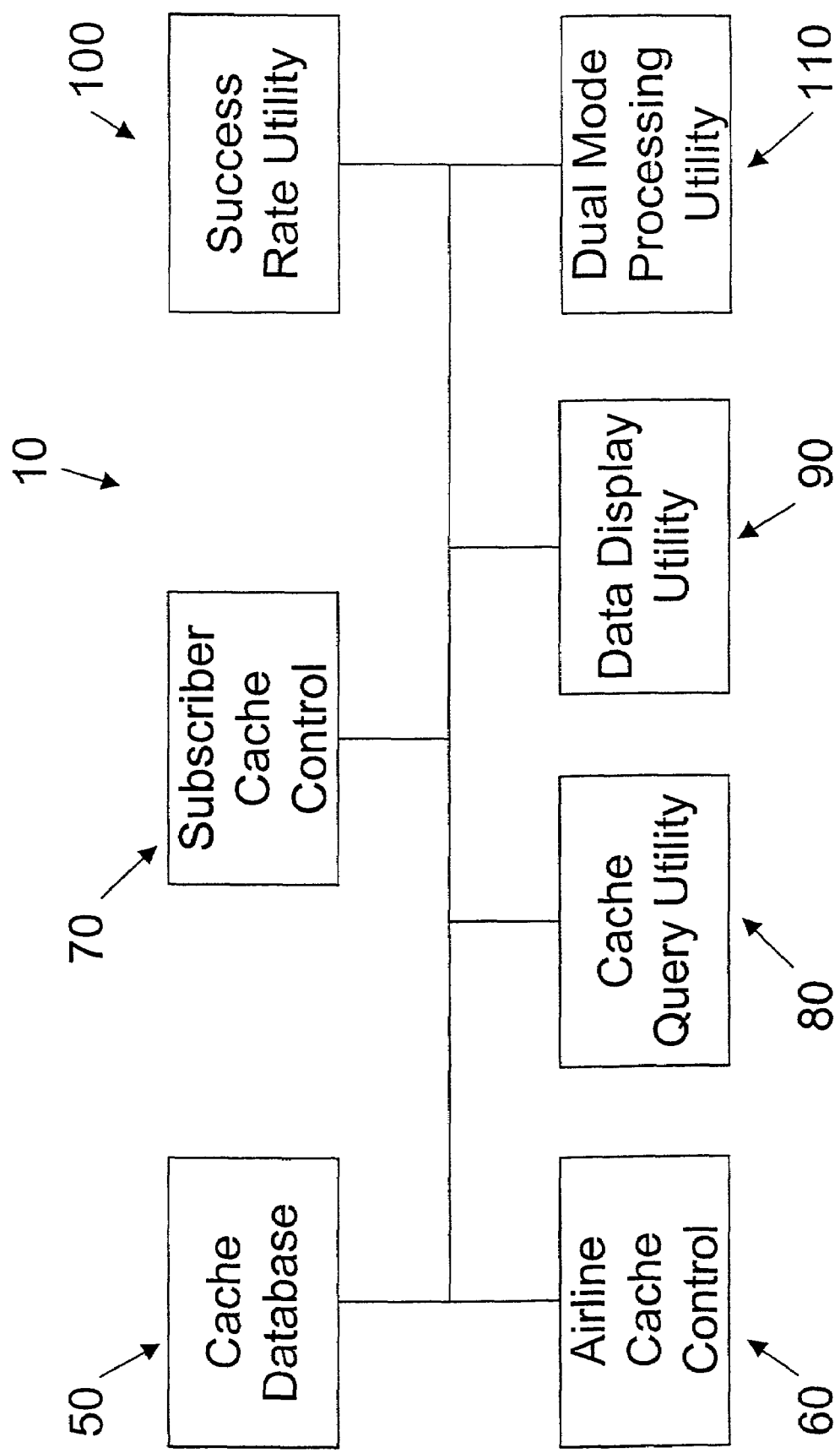
FIG. 2 is a block diagram of the system of the present invention.

Also referring to FIG. 2, the system 10 broadly comprises a cache database 50 for temporarily storing or caching flight availability data, an airline cache control 60 for configuring the cache database 50 specifically for each of a plurality of airlines, a subscriber cache control 70 for configuring the cache database 50 specifically for each subscriber 20, and a cache query utility 80 for interacting with the cache database 50. The system 10 further comprises a data display utility 90 for displaying flight availability data stored in the cache database 50, a success rate utility 100 for tracking statistics associated with use of the cache database 50, and a dual mode processing utility 110 that allows a technician to access flight availability data from either the cache database 50 or the real-time responses.

The cache database 50 is preferably SID and CC specific and configured to only store flight availability data for SIDs and CCs that have been configured to use the cache database 50. This enables fast access to the flight availability data for those SIDs and CCs.

Flight availability data stored in the cache database 50 may be utilized to fulfill subsequent availability requests from the subscriber 20 for which the flight availability data was stored instead of requesting flight availability data again. This reduces a total number of real-time requests and real-time responses that must be handled by the system 10 and the airline servers 25. Additionally, flight availability data stored in the cache database 50 may be utilized when either the real-time request or the real-time response fails.

Trips are preferably stored in the cache database 50 with complete flight availability data including the SID, the CC, one of more boarding points, one or more classes of service, one or more flight numbers, dates, times, and a seat count for every flight in the trip. However, due to selective polling, trips may be stored in the cache database 50 without complete flight availability data. Selective polling is when a particular airline has requested that the system 10 does not request flight availability data for specific flights. Flights for which the system 10 does not request flight availability data are known as non-polled flights.

If a trip includes one or more non-polled flights, the complete trip will typically be included in the availability request. However, the system 10 does not request flight availability data for the non-polled flights in the real-time request. Therefore, the real-time response will not include flight availability data for the non-polled flights and flight availability data from a third party database may used to populate the availability response.

While the trip is stored in the cache database 50 with an indication of each flight in the trip, any non-polled flights will not reflect flight availability data. Specifically, flight availability data from the third party database is not stored in the cache database 50. When the system 10 receives another availability request, the cache database 50 is queried for the trip and the flight availability data in the cache database 50 is combined with flight availability data from the third party database in order to fulfill the availability request.

The airline cache control 60 is used to configure a day range, a shelf-life, and a minimum seat count for flight availability data stored in the cache database 50 for each airline identified by each CC. The day range comprises three digits and can be any number from 000 to 331. The day range specifies for how many days in the future flight availability data should be cached, where 000 represents the current day. Typically, up to five day ranges are configured for each airline. Day ranges preferably do not overlap and all days between 000–331 are preferably accounted for. Each day range can be independently configured, either preventing or allowing applicable fight availability data to be cached, with a unique shelf-life.

For example, the cache database 50 may be configured to cache a specific airline's flight availability data in five day ranges. A first day range could be configured to cover all days from the current day to 30 days in the future. Anticipating that flight availability data for trips within 30 days will change rapidly, the airline may decide to not cache flight availability data for the first day range. A second day range could be configured to cover from 31 days to 60 days in the future with a 10 minute shelf life range, in order to avoid using flight availability data more than 10 minutes old. A third day range could be configured to cover from 61 days to 90 days in the future with a 20 minute shelf-life, not anticipating the flight availability data to change as rapidly as it might for the second range. A fourth day range could be configured to cover from 91 days to 120 days in the future. A fifth day range could be configured to cover from 121 days to 331 days in the future. Both the fourth and fifth day ranges may be configured with a 30 minute shelf-life, not anticipating the flight availability data to change as rapidly as it might for either the second day range or the third day range.

While an example has been described above, any combination of day ranges and shelf-life may be configured. The shelf-life is preferably no greater than 30 minutes in order to prevent flight availability data from becoming stale.

The seat count may be used to specify a minimum number of available seats in order to use flight availability data stored in the cache database 50. The seat count is an optional criteria preferably used to determine if sending the real-time request to the airline servers 25 is necessary. Therefore, the seat count is preferably not used when the cache database 50 is queried as a result of failing to receive the real-time response. For example, if the airline decides that the minimum seat count is 7, all requested classes of service in the cache database 50 must have a seat count equal to or more than 7 seats. If the flight availability data stored in the cache database 50 reflects 6 or fewer seats for any flight in the trip, then the real-time request is sent to the airline servers 25. If the real-time response is not received, then the flight availability data reflecting only 6 seats may be used to populate the availability response. Furthermore, if a matching trip does not exist in the cache database 50 and the real-time response is not received, the third party database may be used to populate the availability response.

The airline control 60 may also be used to limit which SIDs may use flight availability data stored in the cache database 50 for each airline. Alternatively, each airline may choose to not limit any SID's use of flight availability data stored in the cache database 50 for that airline.

Finally, the airline control 60 may be used to allow specific applications to use flight availability data stored in the cache database 50 for each airline. For example, a specific airline may decide to not allow the advanced search tools to use flight availability data stored in the cache database 50. Alternatively, another airline may require that the advanced search tools use flight availability data stored in the cache database 50, while other applications are required to use flight availability data received from the real-time response.

The subscriber control 70 may be used to group each SID into one of a plurality of SID families. Flight availability data is stored in the cache database 50 specifically for each SID or SID family and only available to that SID or SID family. Each SID family consists of one parent SID and one or more child SIDs. Each parent SID may be used in two SID families provided each SID family is of a different type. Each SID family is identified by the parent SID and flight availability data is stored in the cache database 50 under the parent SID. Each child SID is preferably only a member of one SID family. Additionally, each SID family is assigned a family name which is preferably free flow text with up to 15 alphanumeric characters or spaces.

The subscriber control 70 may also be used to configure each SID or SID family to use or not use flight availability data stored in the cache database 50. Additionally, the subscriber control 70 allows each SID family to be configured as either access-type or update-type. Access-type allows each SID in an access-type SID family to access the flight availability data stored in the cache database 50 for that SID family. However, none of the child SIDs in the access-type SID family may update the cache database 50. Only the parent SID of the access-type SID family may update the cache database 50. Update-type allows each SID in an update-type SID family to both access and update the flight availability data stored in the cache database 50 for that SID family.

The cache query utility 80 interfaces with the cache database 50 on behalf of the subscribers 20 and deletes trips from the cache database 50 after the shelf-life has expired, as configured in the airline cache control 60. When flight availability data is received from one of the airline servers 25 in the form of the real-time response, the cache query utility 80 adds the trip to the cache database 50 for use by the subscriber 20 that initiated the availability request. When another availability request is received, the cache query utility 80 queries the cache database 50 for matching trips and forwards any appropriate flight availability data to the requesting subscriber 20.

The data display utility 90 can be used to display flight availability data stored in the cache database 50. The data display utility 90 is primarily a trouble shooting tool designed to assist a technician in diagnosing interface problems between the cache database 50 and the requesting servers 15 or the airline servers 25.

The success rate utility 100 tracks statistics associated with use of flight availability data stored in the cache database 50 and includes a sell failure rate, a total attempts number, and a total use number. The sell failure rate indicates the percentage rate of sell failures resulting from attempts to sell a trip based upon flight availability data stored in the cache database 50 and can be compared to sell failure rates from the real-time request and sell failure rates from the third party database. The total attempts number indicates how many times flight availability data is queried from the cache database 50. The total use number indicates how many times flight availability data is returned as a result of querying the cache database 50. These statistics can be viewed in total, by specific airline, by specific SID, or by specific SID family.

These statistics are preferably refreshed every 15 minutes and available to view online through the success rate utility 100. Additionally, these statistics will preferably automatically clear each day at midnight eastern time. Alternatively, these statistics for the current day plus seven previous days can be made available on a website.

The dual mode processing utility 110 is designed for testing and trouble shooting the system 10, requesting servers 15, airline servers 25, and network connectivity. The dual mode processing utility 110 allows a technician to access flight availability data from either the cache database 50 or the real-time responses. This allows comparisons to determine accuracy of the cache database 50.

It is anticipated that features may be added to the system 10, in order to enhance the system's 10 functionality. A decrement feature may be added that counts the number of sells against the flight availability data stored in the cache database 50 to determine if a trip needs to be updated. A denial feature may be added to automatically update a trip when an attempt to sell the trip is rejected. An overlapping feature may be added to allow overlapping day ranges and shelf-lives. A selective feature may be added to select certain flights for which flight availability data is not to be stored in the cache database 50. Other features may be added to link multiple SID families, group SID families by airline, and/or automatically activate the dual mode processing utility 110 at periodic intervals and report any discrepancies. Still other features may be added to clean and verify the flight availability data in the cache database 50 at a set time and track the statistics by individual requesting servers 15. Finally, a market feature may be added to activate cache by specific markets, such as, trips from New York to London.

While the present invention has been described above, it is understood that substitutes can be made. For instance, the airline cache control 60 may be modified to allow more than five day ranges or more than 30 minutes of shelf-life. Additionally, the seat count may be used to influence the shelf-life. For example, if the seat count is at or near the minimum seat count specified in the airline control 60, then the shelf-life may be reduced. These and other minor modifications are within the scope of the present invention.

Figure 3:
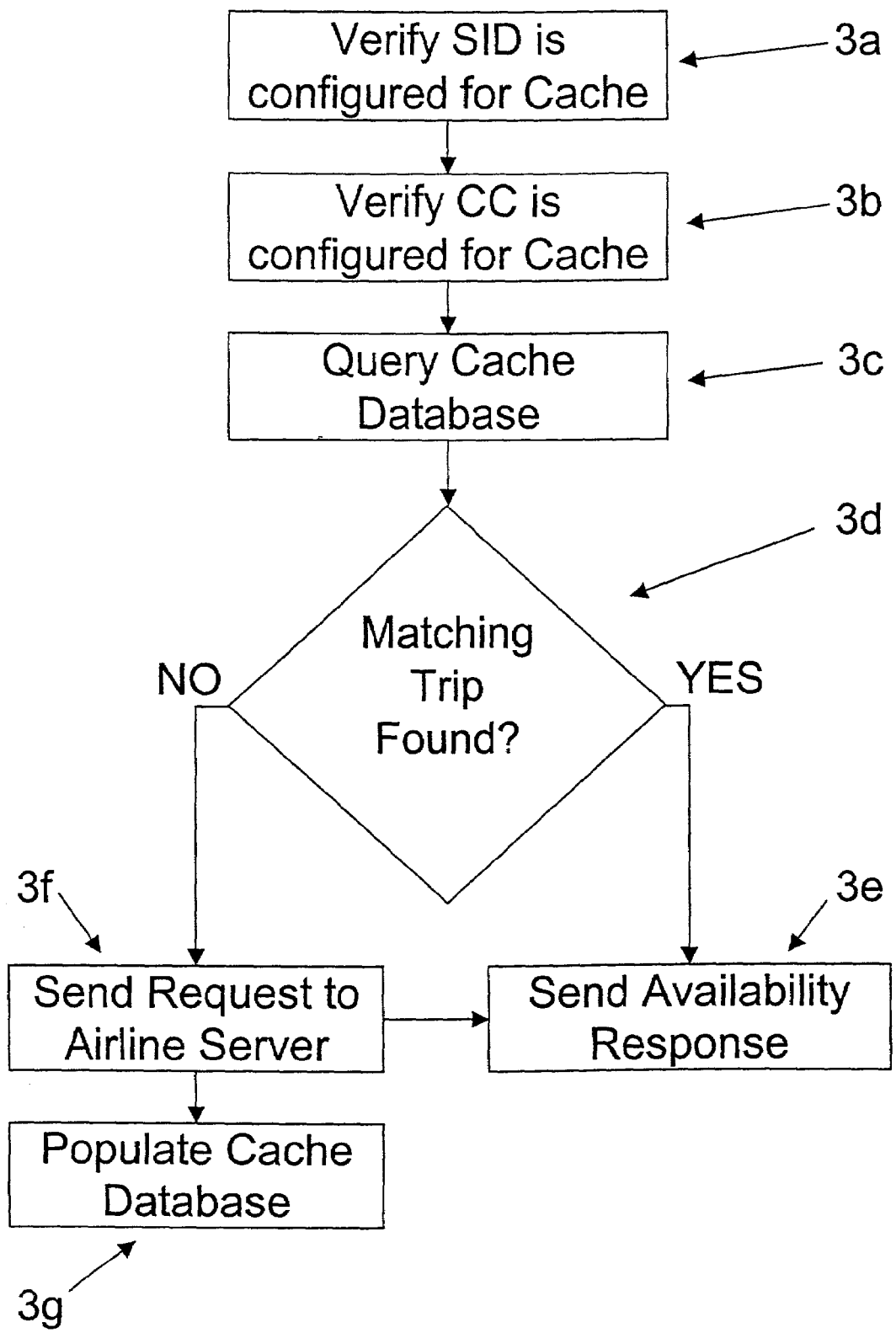
FIG. 3 is a flow chart showing a method of caching and utilizing airline flight availability data according to the present invention.

The flow chart of FIG. 3 shows the functionality and operation of a preferred implementation of the present invention in more detail. In this regard, some of the blocks of the flow chart may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

In use, as shown in FIG. 3, when the availability request is received, the system 10 verifies that the SID is configured to utilize the cache database 50, as shown in step 3a. The system 10 also verifies that the CC is configured to utilize the cache database 50, as shown in step 3b. The system 10 then queries the cache database 50 for the matching trip as specified in the availability request, as shown in step 3c. The system 10 attempts to find the matching trip in the cache database 50, as shown in step 3d. If the cache database 50 contains the matching trip, stored for use by the subscriber 20 that originated the availability request, then the availability response containing flight availability data for that trip is sent to the subscriber 20, as shown in step 3e. If no matching trip is found, then the real-time request is sent to the airline servers 25, as shown in step 3f. Flight availability data returned from the airline servers 25 in the real-time response is used to populate the availability response and the cache database 50, as shown in steps 3e and 3g.

If any step fails, the third party database may be used to fulfill the availability request. For example, when no matching trip exists in the cache database 50, the real-time request is sent to the appropriate airline server 25. If the real-time response is not received, then flight availability data from the third party database may be used to populate the availability response.

Additionally, the cache database 50 may be used in place of an airline server 25 that is experiencing network congestion or outages. If system 10 sends the real-time request to one of the airline servers 25 and the real-time response is not received, the system 10 may use flight availability data stored in the cache database 50. If the matching trip does not exist in the cache database 50, the third party database may be used to populate the availability response.

Furthermore, the cache database 50 may be used in place of the third party database which may be inaccurate. Certain products typically used in conjunction with the system 10, such as, the advanced search tools, may or may not need flight availability data received directly from the airline servers 25 and may currently rely on the third party database. Thus, flight availability data stored in the cache database 50 may be used to enhance the effectiveness of these products, while not placing burdens on the airline servers 25, by providing more accurate flight availability data than is available from the third party database.

What is claimed is:

1. A system for caching and utilizing flight availability data for specific subscribers, the system comprising:
   a server for receiving and processing availability requests from the subscribers;
   a cache database for temporarily storing flight availability data for the subscribers;
   a cache query utility for adding flight availability data from an airline server to the cache database, querying the cache database, returning flight availability data from the cache database that was stored in response to an availability request if a communication failure occurs with the airline server, and deleting flight availability data from the cache database after a shelf-life has expired;
   an airline cache control for configuring a minimum seat count for the flight availability data stored in the cache database for the airline server, wherein the minimum seat count specifies how many seats must be available on each flight in order to use the flight availability data stored in the cache database, the server communicating with the airline server to retrieve flight availability data if the minimum seat count is not satisfied.

2. The system as set forth in claim 1, wherein the cache database is configured to only store the flight availability data for subscribers and airlines that have been configured to use the cache database.

3. The system as set forth in claim 1, wherein the cache query utility only returns the flight availability data stored specifically for use by a specific subscriber.

4. The system as set forth in claim 1, wherein the airline cache control configures a day range for the flight availability data stored in the cache database for each airline wherein the day range specifies for how many days in the future the flight availability data should be cached.

5. The system as set forth in claim 1, wherein the airline cache control configures a shelf-life for the flight availability data stored in the cache database for each airline wherein the shelf-life specifies for how long the flight availability data is valid.

6. The system as set forth in claim 1, wherein the airline cache control specifies specific applications that may use the flight availability data stored in the cache database for each of a plurality of airlines.

7. The system as set forth in claim 1, wherein the airline cache control specifies specific subscribers that may use the flight availability data stored in the cache database for each of a plurality of airlines.

8. The system as set forth in claim 1, wherein the subscriber cache control configures each of a plurality of subscribers to use the cache database.

9. The system as set forth in claim 1, further comprising a subscriber cache control for grouping a plurality of subscribers into one of a plurality of families.

10. The system as set forth in claim 9, wherein the families can be configured as either access-type or update-type.

11. The system as set forth in claim 1, further comprising a data display utility for displaying the flight availability data stored in the cache database.

12. The system as set forth in claim 1, further comprising a success rate utility for tracking statistics associated with use of the flight availability data stored in the cache database, wherein the statistics are selected from the group comprising a sell failure rate, a total attempts number, and a total use number.

13. The system as set forth in claim 1, further comprising a dual mode processing utility for allowing a technician to access flight availability data from either the cache database or a real-time response.

14. The system as set forth in claim 12, wherein the sell failure rate indicates the percentage rate of sell failures resulting, from attempts to sell a trip based upon flight availability data stored in the cache database.

15. A computer program product for caching and utilizing flight availability data for specific subscribers comprising a computer readable medium having computer readable code embedded therein, the computer readable medium comprising:
  a cache database for temporarily storing flight availability data and configured to only store flight availability data for subscribers and airline servers that have been configured to use the cache database;
  a cache query utility for adding flight availability data to the cache database from an airline server, querying the cache database, returning flight availability data from the cache database in response to an availability request if a communication failure with the airline server occurs, deleting flight availability data from the cache database after a shelf-life has expired; and
  an airline cache control for configuring a minimum seat count for using the flight availability data stored in the cache database for each airline, wherein the minimum seat count specifies how many seats must be available on each flight in order to use the flight availability data stored in the cache database, and communicating with the airline server to retrieve flight availability data if the minimum seat count is not satisfied.

16. The computer program product as set forth in claim 15, wherein the airline cache control configures a day range, and a shelf-life for the flight availability data.

17. The computer program product as set forth in claim 15, wherein the airline cache control allows each airline to specify specific ones of a plurality of subscribers that may use the flight availability data stored in the cache database for that airline.

18. The computer program product as set forth in claim 15, further comprising a subscriber cache control for configuring each subscriber to use the cache database and grouping plurality of subscribers into one of a plurality of families wherein the families can be configured as either access-type or update-type.

19. The computer program product as set forth in claim 15, further comprising a success rate utility for tracking statistics associated with use of the flight availability data stored in the cache database.

20. The computer program product as set forth in claim 15, further comprising a dual mode processing utility for allowing a technician to access flight availability data from either the cache database or a real-time response.

21. The program as set forth in claim 19, wherein the tracked statistics include a sell failure rate that indicates the percentage rate of successful attempts to use a trip based upon flight availability data stored in the cache database.

* * * * *